United States Patent
Salzman

[11] Patent Number: 5,868,036
[45] Date of Patent: Feb. 9, 1999

[54] SPLIT TRANSFER WHEEL

[76] Inventor: Donald F. Salzman, 1115 "C" Artman Gibson Rd., Colville, Wash. 99114

[21] Appl. No.: 870,799

[22] Filed: Jun. 6, 1997

[51] Int. Cl.⁶ .............................. F16H 55/32; F16H 55/46
[52] U.S. Cl. ................................. 74/450; 193/37; 301/30; 476/72; 451/498; 101/415.1
[58] Field of Search ................................. 74/450; 476/72; 451/498, 538; 301/32, 31, 30.2, 30; 101/415.1; 193/37

[56] References Cited

U.S. PATENT DOCUMENTS

| | | | |
|---|---|---|---|
| 1,422,550 | 7/1922 | Egerton | 476/72 |
| 1,795,702 | 3/1931 | Barton | 451/489 |
| 2,789,401 | 4/1957 | Hargreaves | 451/498 |
| 3,097,541 | 7/1963 | Kindig | 74/450 |
| 4,402,390 | 9/1983 | Feeney | 193/37 |
| 4,969,548 | 11/1990 | Kornylak | 193/37 X |
| 5,492,498 | 2/1996 | Casillas et al. | 451/498 X |

Primary Examiner—Rodney H. Bonck
Assistant Examiner—William C. Joyce
Attorney, Agent, or Firm—Wells, St. John, Roberts, Gregory & Matkin P.S.

[57] ABSTRACT

A split transport wheel is described including first and second wheel halves, each having an arcuate external tire receiving surface spanned by a joint surface. The two halves may be selectively assembled with the joint surfaces in juxtaposition and with the tire receiving surfaces forming a relatively continuous tire receiving surface. A clamp assembly releasably joins the first and second wheel halves and is selectively operable to (a) draw the respective joint surfaces together in juxtaposition and (b) release the first and second wheel halves to be separated. A tire, formed of a strip of tire material, may be releasably wrapped about the tire receiving surfaces of the wheel halves. A first tire end anchor on the first wheel half releasably receives one of the strip ends, and a second tire end anchor on the second wheel half releasably receives the remaining tire strip end. The tire end anchors are positioned inwardly adjacent the first end of each joint surface to receive and clamp the strip ends responsive to operation of the clamp assembly to draw the respective joint surfaces together.

19 Claims, 4 Drawing Sheets

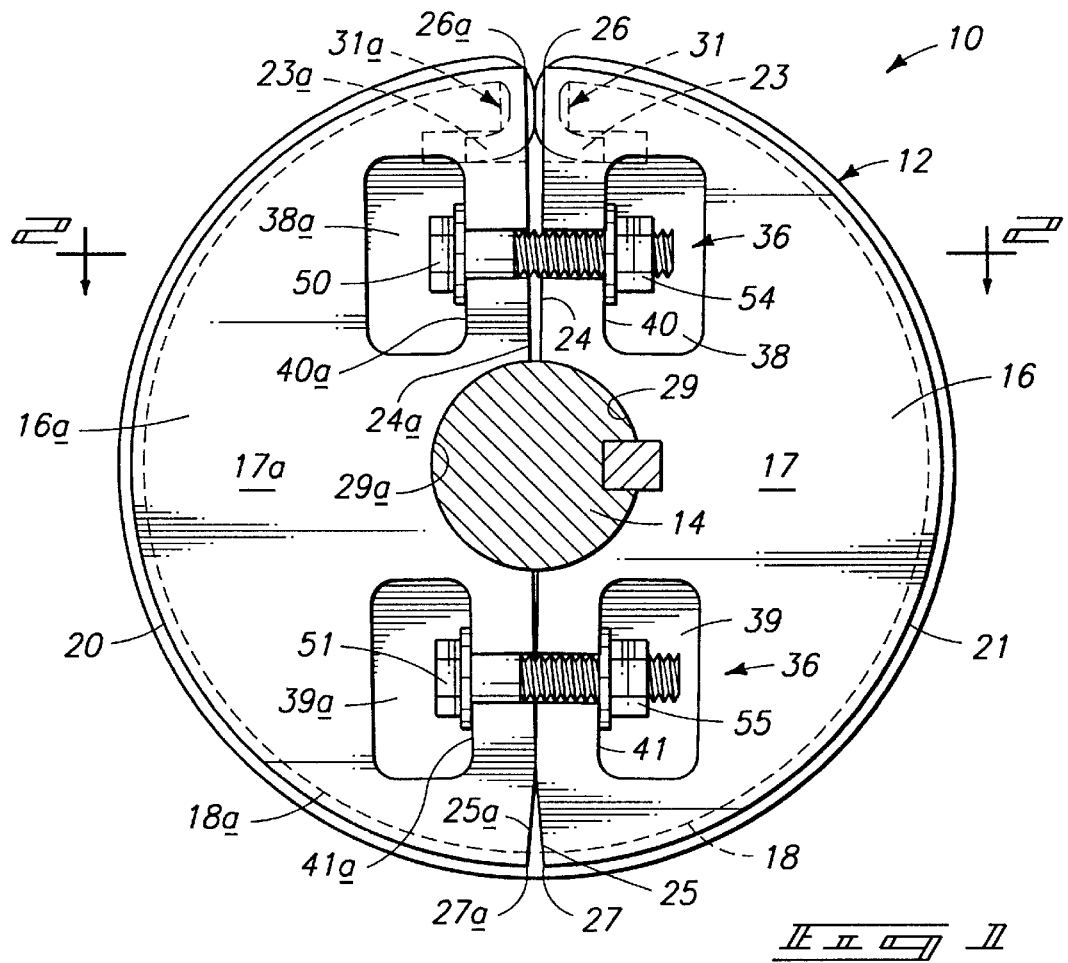
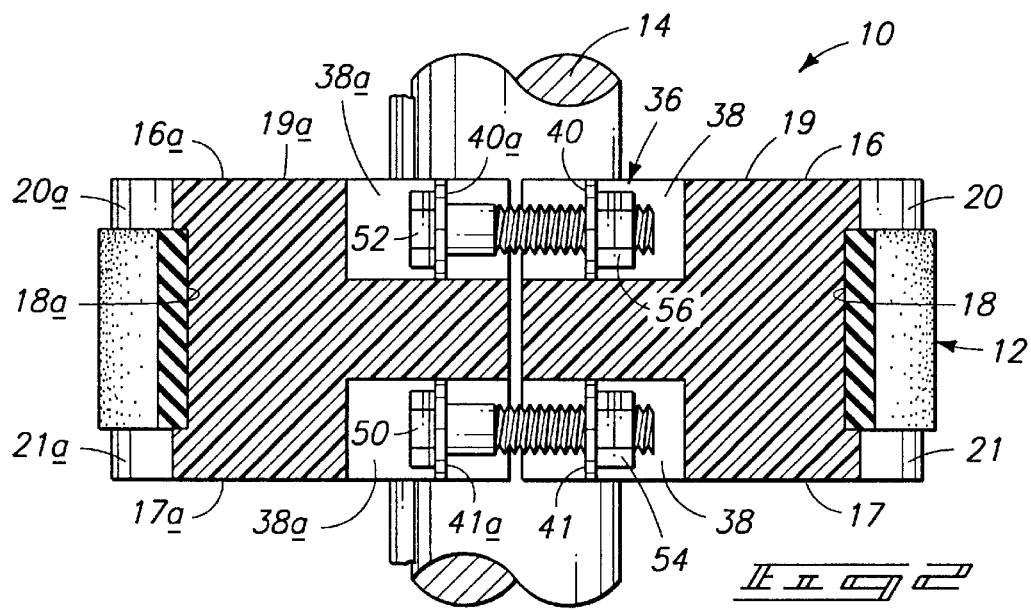

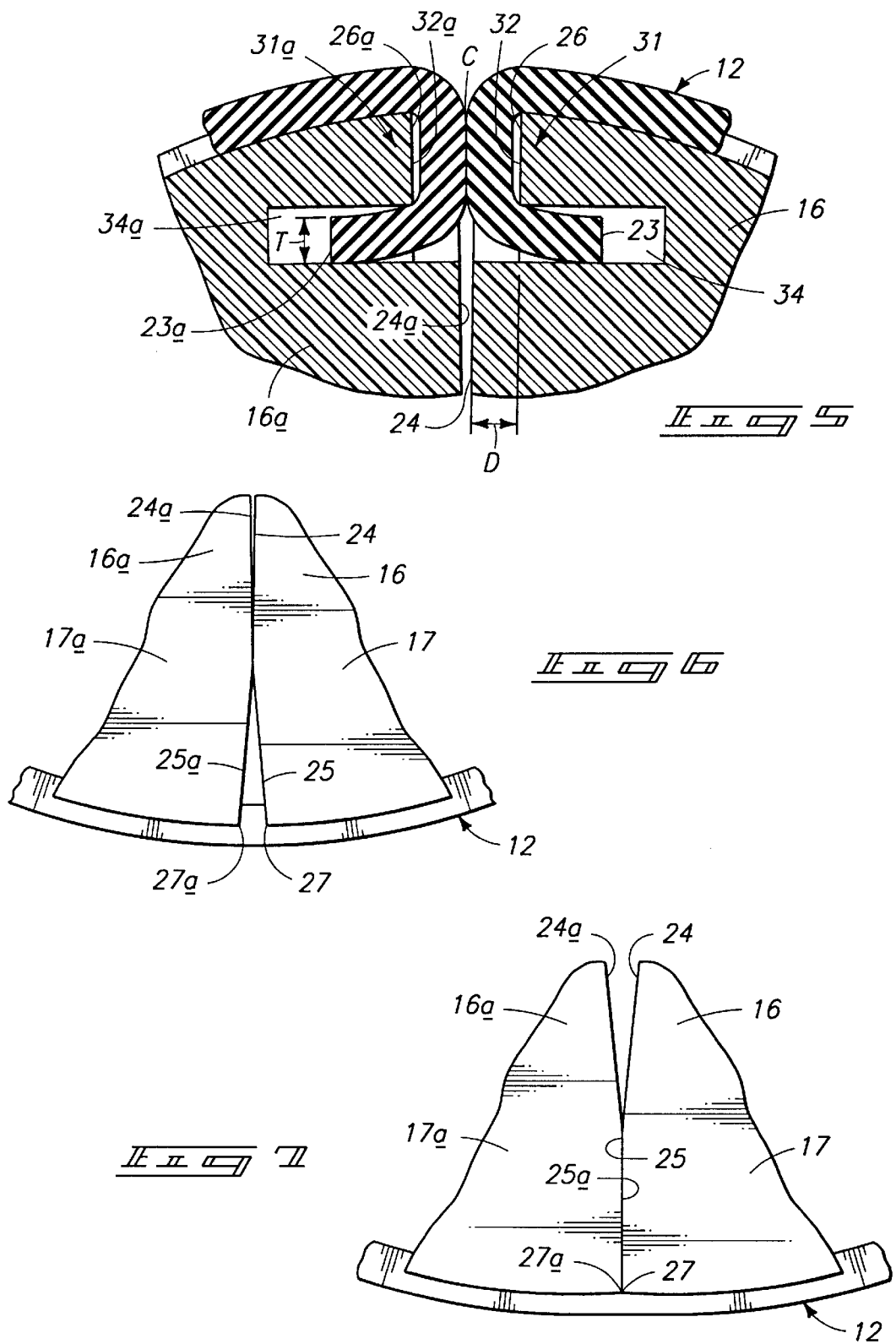

SPLIT TRANSFER WHEEL

TECHNICAL FIELD

The present invention relates to split transfer wheels with removable tires.

BACKGROUND OF THE INVENTION

Many different materials in various industries are transferred from one location to another by use of powered transfer wheels. Such wheels are typically used in multiples on driven shafts to rotate against the various materials to impart movement. The same form of wheels are used as idlers, free-wheeling to guide and support moving materials. In all instances, the outer peripheral surfaces of the wheels eventually wear.

A typical transfer wheel is formed of a plastic material such as nylon, or high density polyethylene, with a peripheral tire formed of a softer material. The soft tire material is often molded onto the wheel rim and is replaced only by a re-molding process. The wheel must therefor be removed from its drive or idler shaft and taken to a facility where the re-molding process is performed. Unless spare wheels are provided, costly down time for the associated machinery can result. Further, considerable labor expense becomes involved in removing, then re-mounting the wheels. Still further, the re-molding process is both time consuming and costly.

A long felt need has thus been recognized for a transfer wheel that makes use of inexpensive, readily available tire materials, and that can be reconditioned by changing tire materials without requiring removal of the wheel from the supporting shaft. This need is fulfilled as will be seen from the following description, drawings and claims which set forth the presently preferred embodiments of my invention.

BRIEF DESCRIPTION OF THE DRAWINGS

Preferred embodiments of the invention are described below with reference to the following accompanying drawings.

FIG. 1 is a front end elevation view of a first preferred form of the present split transfer wheel with a tire mounted thereon;

FIG. 2 is a sectional view taken substantially along line 2—2 in FIG. 1;

FIG. 5 is an enlarged fragmented sectional view showing mounting of the tire ends;

FIG. 6 is a fragmented operational view of relief surfaces on the wheel halves and their related positions when the wheel and tire are assembled and operational; and FIG. 7 is a fragmented operational view of relief surfaces on the wheel halves and their related positions when the wheel halves are separated for tire removal and replacement.

DETAILED DESCRIPTION OF THE PREFERRED EMBODIMENTS

Figure 3:
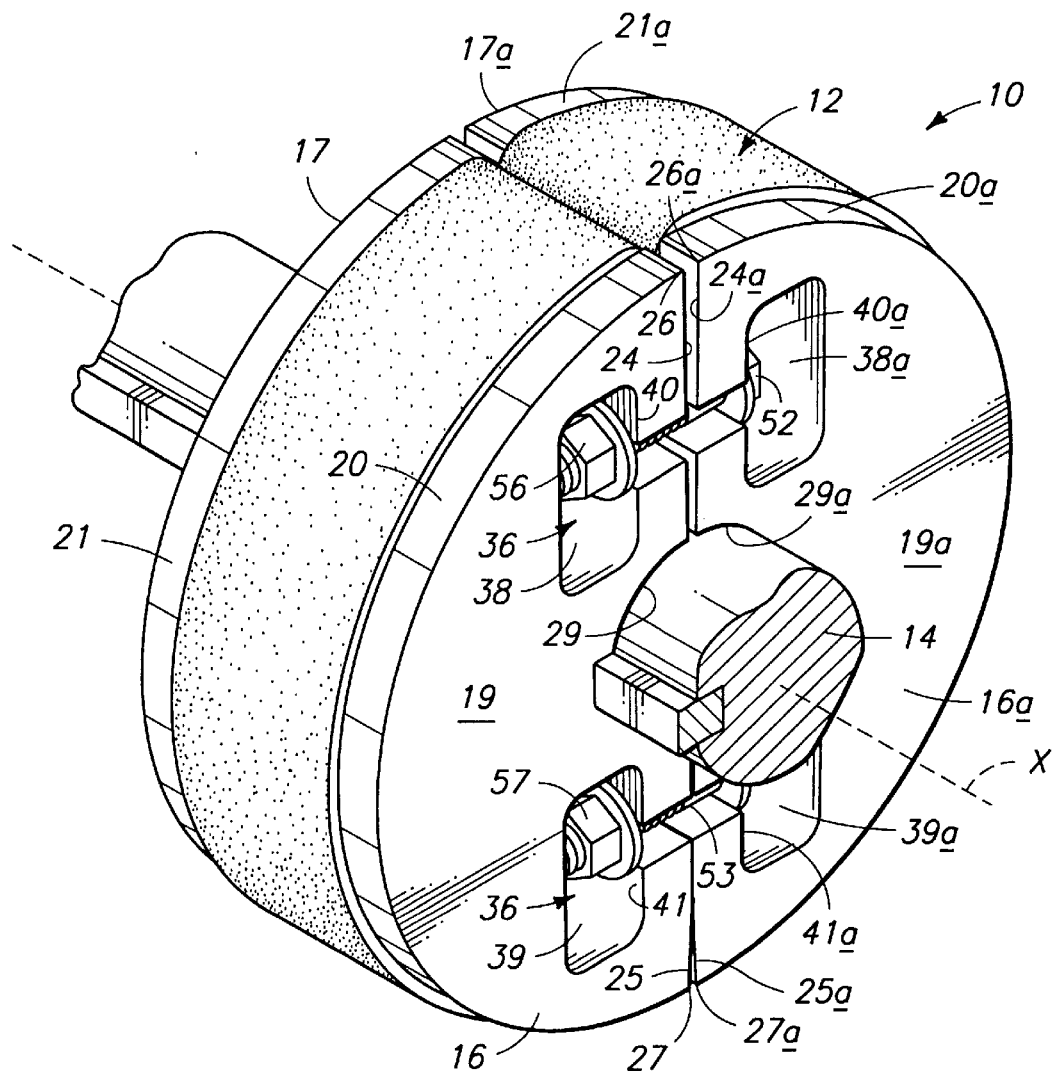
FIG. 3 is a perspective rearward end view of the preferred split wheel.

This disclosure of the invention is submitted in furtherance of the constitutional purposes of the U.S. Patent Laws "to promote the progress of science and useful arts" (Article 1, Section 8).

A first preferred form of my split transport wheel is generally designated by the reference numeral 10 in the accompanying drawings. The wheel is shown assembled in FIGS. 1–3, mounting a tire 12 used to engage and transfer materials. The wheel 10 is useful in many different industries for many different materials and can be produced in a variety of sizes and from various components. The wheel 10 is useful in numerous orientations and can be operated either to transmit motive force or as a freewheeling idler wheel for guiding purposes.

It is anticipated that one or more of the wheels 10 will be provided for mounting on a shaft 14, although modifications could be made to enable mounting one or more of the present wheels 10 to a conventional hub, flange or other appropriate mounting device (not shown).

In a first preferred form, the present wheel 10 includes first and second wheel halves 16, 16a. Preferably the wheel halves are substantially identical (with a possible exception of a keyway provision in one of the halves as shown in FIGS. 1–3). Providing matched wheel halves substantially minimizes manufacturing time and expense.

The general configuration of each wheel half 16, 16a is semi-circular, such that when the halves are mounted together, a full circular wheel shape is obtained. The circular shape is formed about a central longitudinal axis X (FIG. 3) which may be coincidental with the axis of the carrier shaft 14. Of course other, non circular configurations could be used, especially if the wheels are to be used, for example, as cams. In any case, the two halves 16, 16a are configured to be secured together to present at least a relatively continuous periphery.

A preferred material for construction of the wheel halves 16, 16a is a plastic material such as high or ultra high molecular weight polyethylene. This material is preferred for its durability, low friction co-efficiency, resistance to corrosion, and machinability; though other materials may be used, especially if the wheel halves are to be cast or injection molded. In the presently preferred form, the wheel halves are machined from solid stock.

Figure 4:
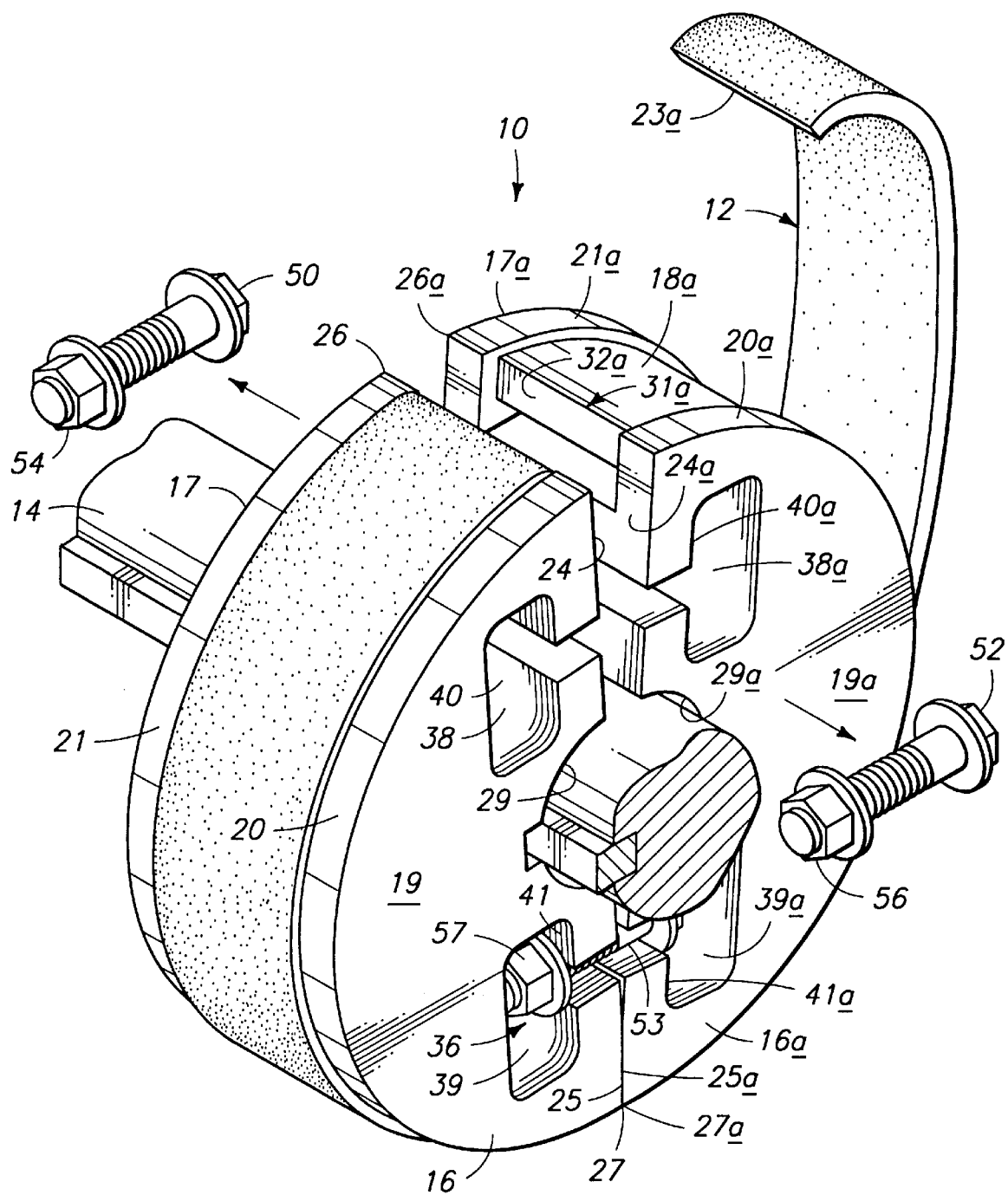
FIG. 4 is a view similar to FIG. 3 only showing one end of the tire partially removed and the wheel halves separated to facilitate tire removal and replacement.

Referring to the wheel halves in greater detail, FIG. 2 shows that an external tire receiving surfaces 18, 18a extend about the outer arcuate perimeters of the wheel halves. The tire receiving surfaces 18, 18a are recessed, forming axially opposed raised marginal rims 20, 20a and 21, 21a on the respective wheel halves. The rims extend outwardly of the tire receiving surfaces 18, 18a to axially confine a removable tire strip 12 (FIG. 4).

The axial thickness of the wheel halves is measured between transverse end surfaces 17, 17a and 19, 19a. This thickness dimension may vary according to need and application. The end surfaces are preferably parallel and flat, but could be produced otherwise, again according to need and application.

The tire strip 12 may be selected from a number of materials, but is preferably formed of a resilient material such as real or synthetic rubber. It is most preferred that the tire material be of a standard conveyor belting, one example of which is a three ply elastomeric "rough top" belting produced by Goodyear Tire and Rubber Co. in Marysville Ohio.

Belting material is preferred for the tire strips since it is commercially available and can be purchased in rolls. Elastomeric belting may be easily used with the present split wheels 10 substantially regardless of the wheel diameters. The user may simply remove worn tire materials, cut desired lengths of new tire material from the roll of belting material, and mount the cut strip on the wheel. This can be done, as will be explained below, without removing the wheel from its mounting shaft. Alternatively, the tire strips may be provided in pre-cut lengths, extending a length dimension between ends 23, 23a that is selected to fit prescribed wheel diameters.

It is preferred that the tire material be selected as having a width dimension substantially equal or slightly less than the axial width dimension of the tire receiving surfaces (between the rims 20, 21 and 20a, 21a). Further, the tire strip 12 is selected with a prescribed thickness dimension that is greater than the radial height of the rims from the tire receiving surfaces 18, 18a. Thus the rims 20, 20a and 21, 21a will serve to hold the tire strip 12 in place axially, and the outer surface of the tire material will be exposed beyond the rims for yieldably engaging the materials being handled.

The preferred wheel halves include opposed joint surfaces 24, 24a that span the tire receiving surfaces 18, 18a. The joint surfaces extend between a first ends 26, 26a and second ends 27, 27a, spanning the respective tire receiving surfaces 18, 18a. The joint surfaces are configured to be positioned in juxtaposition (FIG. 1) such that the tire receiving surfaces 18, 18a form a substantially annular perimeter.

In preferred forms, the joint surfaces 24, 24a are substantially flat and parallel to one another and to the longitudinal axis X (when clamped together). An angular relief surface (FIGS. 1, 6 and 7) is formed on at least one of the joint surfaces of one wheel half at the second end thereof. Preferably a pair of the relief surfaces 25, 25a are formed and lead at obtuse angles from the respective joint surfaces to the associated tire receiving surfaces. The relief surfaces 25, 25a enable the wheel halves to be angularly separated on the shaft 14 (compare FIGS. 6 and 7) to facilitate changing of the tire strip 12.

In the example illustrated, the joint surfaces 24, 24a are substantially radial with respect to bore sections 29, 29a that function as arbor shaft receivers on the first and second wheel halves. The bore sections 29, 29a in the illustrated embodiment are semi-cylindrical and are formed in the wheel halves, centered on the wheel axis X to receive the shaft 14. If desired, one of the bore sections may be formed to receive a key or other appropriate locking device so the wheel will rotate with the shaft.

At least one of the wheel halves includes a tire end anchor, preferably positioned adjacent the first ends 26, 26a of the joint surfaces 24, 24a to releasably receiving one of the tire strip ends. Most preferably both wheel halves include first and second tire end anchors 31, 31a that are situated at the first ends 26 of the wheel halves 16, 16a. The end anchors releasably secure the tire strip ends inwardly (in a radial direction) of the tire receiving surfaces 18, 18a.

The anchors 31, 31a are shown in greater detail in FIG. 5. There it is shown that the end anchors are formed into the joint surfaces adjacent the tire receiving surfaces at the first ends 26, 26a of the joint surfaces. The end anchors preferably include anchor recess surfaces 32, 32a that are formed in the wheel halves substantially parallel to the associated joint surfaces 24, 24a.

The anchor recess surfaces 32, 32a are spaced from the joint surfaces by distances "D" slightly less than the prescribed thickness "T" of the tire strip. This is done so a part of the tire strip will extend as shown in FIG. 5, outwardly of the respective joint surfaces. The anchor recess surfaces 32, 32a can thus be used to help secure the tire strip ends when the wheel halves are drawn together by a clamping assembly described in greater detail below. This also minimizes the crease "C" made by the bends in the tire strip where the ends enter the wheel.

In one preferred example, three ply "rough-top" belting having a thickness dimension of approximately ⅜ inches is used on wheel halves having anchor recess surface depth dimension "D" of approximately 5/16 inches. The belting thus projects 1/16 inches beyond the adjacent joint surfaces 24, 24a. The exposed belt surfaces will engage and compress against one another (FIG. 5) as the wheel halves are clamped together.

In addition to the anchor recess surfaces, the preferred tire anchors include lateral slots 34, 34a to assist in releasably securing the tire strip ends. The slots are sized to be slightly larger than the cross-sectional size of the tire strip, and extend into the wheel halves at angles substantially normal to the joint surfaces 24, 24a. They are situated at radial inward ends of the anchor recess surfaces 32, 32a to receive and hold the tire ends as shown clearly in FIG. 5.

A clamp assembly 36 releasably joins the first and second wheel halves 16, 16a and is selectively operable to (a) draw the respective joint surfaces 24, 24a together in juxtaposition and (b) release the first and second wheel halves 16, 16a to be separated. A preferred form of the clamp assembly is exemplified by FIGS. 1–4 in the drawings.

The preferred clamp assembly includes four pairs of clamp recesses 38, 38a and 39, 39a that are formed in respective end surfaces 17, 17a and 19, 19a of the first and second wheel halves 16, 16a. The clamp recesses are substantially normal to and open on the joint surfaces 24, 24a. In the preferred form, two interacting sets of the clamp recesses are provided, spaced to opposite sides of the central longitudinal axis X. One set of paired recesses 38, 38a are above the axis, and one paired set 39, 39a are situated below the axis.

Pairs of abutment surfaces 40, 40a, and 41, 41a are formed within the respective clamp recesses. The abutment surfaces are arranged to be substantially parallel to the joint surfaces. Further, the abutment surfaces are situated between the associated joint surface and tire receiving surface.

The clamp assembly further includes headed bolts 50–53 and nuts 54–57 threadably engaging the bolts. Appropriate washers may also be provided as shown. A bolt and nut assembly is releasably received within each of the clamp recesses, with the washers thereon engaging the associated abutment surfaces and with the bolt heads and nuts situated outward of the abutment surfaces (toward the tire receiving surfaces). The bolts and nuts may be selectively tightened to exert clamping forces against the abutment surfaces, drawing the wheel halves together. They may also be loosened to allow the wheel halves to be separated.

The nut and bolt assemblies positioned toward the tire end anchors 31, 31a may be loosened more than the remaining nut and bolt assemblies to enable the wheel halves to be angularly separated on the shaft 14 as shown in FIG. 4. Alternatively, the nut and bolt assemblies may be selectively removed from the wheel halves to permit complete disassembly of the wheel from the shaft.

INSTALLATION AND OPERATION

To install one of the present split wheels 10 on a shaft, the user may elect to assemble the wheel halves on the shaft, or assemble the wheel halves loosely then slide the wheel onto the shaft. If the split wheel 10 is provided as a combination with a tire 12 already in place, the user may elect to install the assembled wheel by loosening the bolt and nut assemblies, then prying the wheel halves apart so the wheel will slip easily over the shaft. If the wheel halves are provided independently of a tire the same procedure may be used, or the wheel halves may be separated by removing the bolt and nut assemblies. The wheel halves may then be re-assembled on the shaft.

To mount a tire strip 12 on the split wheel, the user may elect to simply loosen the bolt and nut assemblies enough to allow the wheel halves to be angularly separated (see FIGS. 4 and 7). This action is aided by the relief surfaces 25, 25a at the opposite ends of the joint surfaces.

The wheel halves are now spread apart to open a space between the tire anchor surfaces 31, 31a, sufficient to enable the user to insert an end of a tire strips 12 into a selected one of the anchor slots 34, or 34a on one of the wheel halves. The tire strip 12 is then wrapped around the same wheel half and on around the other wheel half, along the tire receiving surfaces 18, 18a (between the rims).

Now the remaining end of the tire strip 12 may be bent inwardly and inserted into the remaining anchor slot. The tire is now loosely mounted to the wheel, with the tire strip ends secured within the anchor slots. Now the bolt and nut combinations may be tightened, forcing the engaged abutment surfaces together and consequently pulling the wheel halves together. The previously formed gap will close, stretching the tire strip and securely clamping the strip ends in place. The wheel is now ready for use.

The tire material will eventually wear with use and replacement becomes desirable. Replacement of the tire is easily and quickly accomplished without requiring removal of the wheel from the shaft. The worn tire is removed simply by loosening the bolt and nut assemblies, separating the wheel halves to gain access to the tire strip ends, then pulling the tire strip ends free of the anchor slots and the tire receiving surfaces. A new tire strip may then be secured to the wheel by repeating the steps described above.

It is pointed out that the tire strips may be initially provided on a roll, requiring that successive tire strip lengths be cut individually. Thus the user may first wish to determine the circumference about the tire receiving surfaces plus the distances from the tire receiving surfaces to the anchor slots. The sum of these distances is slightly less than the desired cut length of the tire strip (to allow for the tire strip ends to be inserted in the slots 34, 34a). Of course this dimension could be provided as indicia on the wheel or be otherwise supplied to eliminate the need for measuring.

Alternatively, supplies of pre-cut tire strips may be produced and distributed according to particular wheel sizes.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A split transport wheel for releasably mounting a tire formed of a strip of tire material, comprising:
    first and second wheel halves, having arcuate external tire receiving surfaces and opposed joint surfaces spanning the tire receiving surfaces;
    each of said joint surfaces extending between a first end and a second end and configured to be positioned in juxtaposition such that the tire receiving surfaces form a substantially annular perimeter;
    a clamp assembly releasably joining the first and second wheel halves and selectively operable to (a) draw the respective joint surfaces together in juxtaposition and (b) release the first and second wheel halves to be separated;
    a single tire end anchor situated radially inwardly adjacent the tire receiving surface at the first end of each joint surface; and
    a relief surface formed on the joint surface of one wheel half adjacent the second end thereof, and leading at an obtuse angle from the joint surface of the one wheel half to the associated wheel receiving surface.

2. A split transport wheel as claimed by claim 1 further comprising an arbor shaft receiver on the first and second wheel halves, centered on a wheel axis.

3. A split transport wheel as claimed by claim 1 wherein the annular perimeter is cylindrical and formed about a wheel axis and further comprising an arbor shaft receiver on the first and second wheel halves, centered on the wheel axis.

4. A split transport wheel as claimed by claim 1 wherein the annular perimeter is cylindrical and formed about a wheel axis and wherein the joint surfaces are formed in axial planes that are substantially parallel to the wheel axis.

5. A split transport wheel as claimed by claim 1
    wherein the relief surface is formed on each joint surface of the first and second wheel halves at the second ends thereof; and
    wherein said relief surfaces diverge in a radial outward direction.

6. A split transport wheel as claimed by claim 1 wherein the first and second wheel halves are substantially identical.

7. A split transport wheel as claimed by claim 1 wherein the wheel halves are formed about a central longitudinal axis, and further comprising:
    clamp recesses formed in the first and second wheel halves, substantially normal to the joint surfaces;
    an abutment surface within each recess, positioned between the associated joint surface and tire receiving surface;
    headed bolts and nuts threadably engaging the bolts; and
    the abutment surfaces and clamp recesses being configured to releasably receive the headed bolts and nuts with the bolt heads and nuts situated toward the tire receiving surfaces from the abutment surfaces and releasably engaging the abutment surfaces to selectively force the joint surfaces together.

8. A split transport wheel as claimed by claim 1 wherein the wheel halves are formed about a central longitudinal axis, and further comprising:
    end surfaces on each of the wheel halves that are substantially normal to the axis;
    two sets of clamp recesses formed in the first and second wheel halves and opening on the end surfaces;
    the clamp recesses being oriented substantially normal to the joint surfaces and spaced to opposed sides of the central longitudinal axis;
    an abutment surface within each clamp recess, and positioned between the associated joint surface and tire receiving surface; and
    wherein the clamp assembly includes headed bolts and nuts threadably engaging the bolts;
    the abutment surfaces and clamp recesses being configured to releasably receive the headed bolts and nuts with the bolt heads and nuts situated toward the tire receiving surfaces from the abutment surfaces and releasably engaging the abutment surfaces to selectively force the joint surfaces together.

9. A split transport wheel as claimed by claim 1 further comprising:

raised rims on the wheel halves extending outwardly of the tire receiving surfaces.

10. A split transport wheel, comprising:

first and second wheel halves, having arcuate external tire receiving surfaces and opposed joint surfaces spanning the tire receiving surfaces;

each of said joint surfaces extending between a first end and a second end and configured to be positioned in juxtaposition such that the tire receiving surfaces form a substantially annular perimeter;

a clamp assembly releasably joining the first and second wheel halves and selectively operable to (a) draw the respective joint surfaces together in juxtaposition and (b) release the first and second wheel halves to be separated;

a tire formed of a strip of tire material extending between opposed strip ends and releasably wrapped about the tire receiving surfaces of the wheel halves;

a first tire end anchor on the first wheel half releasably receiving one of the strip ends;

a second tire end anchor on the second wheel half releasably receiving a remaining one of the strip ends;

wherein the tire end anchors are positioned radially inward and adjacent to the first end of each joint surface to receive and secure the strip ends responsive to operation of the clamp assembly to draw the respective joint surfaces together in juxtaposition; and a relief surface formed on the joint surface of one wheel half adjacent the second end thereof, and leading at an obtuse angle from the joint surface of the one wheel half to the associated wheel receiving surface.

11. A split transport wheel as claimed by claim 10 further comprising an arbor shaft receiver on the first and second wheel halves, centered on a wheel axis.

12. A split transport wheel as claimed by claim 10 wherein the annular perimeter is cylindrical and formed about a wheel axis and further comprising an arbor shaft receiver on the first and second wheel halves, centered on the wheel axis.

13. A split transport wheel as claimed by claim 10 wherein the annular perimeter is cylindrical and formed about a wheel axis and wherein the joint surfaces are formed in axial planes that are substantially parallel to the wheel axis.

14. A split transport wheel as claimed by claim 10 wherein the relief surface is formed on each joint surface of the first and second wheel halves adjacent to the second ends thereof; and wherein said relief surfaces diverge from one another in a radial outward direction.

15. A split transport wheel as claimed by claim 10 wherein the first and second wheel halves are substantially identical.

16. A split transport wheel as claimed by claim 10 wherein the wheel halves are formed about a central longitudinal axis, and further comprising:

clamp recesses formed in the first and second wheel halves, substantially normal to the joint surfaces;

an abutment surface within each clamp recess, positioned between the associated joint surface and tire receiving surface; and wherein the clamp assembly includes headed bolts and nuts threadably engaging the bolts; and the abutment surfaces and clamp recesses being configured to releasably receive the headed bolts and nuts with the bolt heads and nuts situated toward the tire receiving surfaces from the abutment surfaces and releasably engaging the abutment surfaces to selectively force the joint surfaces together.

17. A split transport wheel as claimed by claim 10 wherein the wheel halves are formed about a central longitudinal axis, and further comprising:

end surfaces on each of the wheel halves that are substantially normal to the axis;

two sets of clamp recesses formed in the first and second wheel halves and opening on the end surfaces;

the clamp recesses being oriented substantially normal to the joint surfaces and spaced to opposed sides of the central longitudinal axis;

an abutment surface within each clamp recess, positioned between the associated joint surface and tire receiving surface; and wherein the clamp assembly includes headed bolts and nuts threadably engaging the bolts;

the abutment surfaces and clamp recesses being configured to releasably receive the headed bolts and nuts with the bolt heads and nuts situated toward the tire receiving surfaces from the abutment surfaces and releasably engaging the abutment surfaces to selectively force the joint surfaces together.

18. A split transport wheel as claimed by claim 10 wherein the tire includes a thickness dimension and wherein at least one of the tire end anchors includes an anchor recess surface formed in one of the wheel halves substantially parallel to the associated joint surface and spaced therefrom by a distance less than the thickness dimension of the tire.

19. A split transport wheel for releasably mounting a tire formed of a strip of tire material, comprising:

first and second wheel halves, having arcuate external tire receiving surfaces and opposed joint surfaces spanning the tire receiving surfaces;

each of said joint surfaces extending between a first end and a second end and configured to be positioned in juxtaposition such that the tire receiving surfaces form a substantially annular perimeter;

a clamp assembly joining the first and second wheel halves and selectively operable to (a) draw the respective joint surfaces together in juxtaposition and (b) release the first and second wheel halves to be separated; and a tire end anchor formed along at least one of the joint surfaces adjacent the tire receiving surface;

wherein the tire end anchor includes a lateral tire end receiving slot oriented substantially normal to the joint surface of the at least one joint surface to receive and secure an end of the tire when the first and second wheel halves are together in juxtaposition; and a relief surface formed on the joint surface of one wheel half adjacent the second end thereof, and leading at an obtuse angle from the joint surface of the one wheel half to the associated wheel receiving surface.

* * * * *

UNITED STATES PATENT AND TRADEMARK OFFICE
CERTIFICATE OF CORRECTION

PATENT NO. : 5,868,036
DATED : February 9, 1999
INVENTOR(S) : Donald F. Salzman

It is certified that error appears in the above-identified patent and that said Letters Patent is hereby corrected as shown below:

On the title page, Item [56], delete the following;

| | | | |
|---|---|---|---|
| 856,601 | 6/1907 | Prevost | |
| 1,593,685 | 7/1926 | Ashton | |
| 2,214,841 | 9/1940 | Svoboda | 74/230.7 |
| 2,240,559 | 5/1941 | Hawkinson | 29/78 |
| 2,471,934 | 5/1949 | Chudner | 51/194 |
| 2,652,666 | 9/1953 | Longbotham | 51/194 |
| 3,775,821 | 12/1973 | Somerville | 29/129 |
| 4,926,995 | 5/1990 | Kauffman | 193/37 |
| 5,139,134 | 8/1992 | Schenck | 198/780 |

Signed and Sealed this

Twentieth Day of July, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO. : 5,868,036
DATED : February 9, 1999
INVENTOR(S) : Donald F. Salzman

It is certified that error appears in the above-identified patent and that said Letters Patent is hereby corrected as shown below:

On the title page, Item [56], insert the following:

| | | | |
|---|---|---|---|
| 856,601 | 6/1907 | Prevost | |
| 1,593,685 | 7/1926 | Ashton | |
| 2,214,841 | 9/1940 | Svoboda | 74/230.7 |
| 2,240,559 | 5/1941 | Hawkinson | 29/78 |
| 2,471,934 | 5/1949 | Chudner | 51/194 |
| 2,652,666 | 9/1953 | Longbotham | 51/194 |
| 3,775,821 | 12/1973 | Somerville | 29/129 |
| 4,926,995 | 5/1990 | Kauffman | 193/37 |
| 5,139,134 | 8/1992 | Schenck | 198/780 |

This certificate supersedes Certificate of Correction issued July 20, 1999.

Signed and Sealed this

Fifth Day of September, 2000

*Attest:*

Q. TODD DICKINSON

*Attesting Officer*  *Director of Patents and Trademarks*